US011990121B2

(12) United States Patent
Sharifi et al.

(10) Patent No.: US 11,990,121 B2
(45) Date of Patent: May 21, 2024

(54) DISTILLING TO A TARGET DEVICE BASED ON OBSERVED QUERY PATTERNS

(71) Applicant: Google LLC, Mountain View, CA (US)

(72) Inventors: Matthew Sharifi, Kilchberg (CH); Victor Carbune, Zürich (CH)

(73) Assignee: Google LLC, Mountain View, CA (US)

( * ) Notice: Subject to any disclaimer, the term of this patent is extended or adjusted under 35 U.S.C. 154(b) by 338 days.

(21) Appl. No.: 17/644,427

(22) Filed: Dec. 15, 2021

(65) Prior Publication Data

US 2023/0111618 A1 Apr. 13, 2023

Related U.S. Application Data

(60) Provisional application No. 63/262,465, filed on Oct. 13, 2021.

(51) Int. Cl.
| | |
|---|---|
| *G10L 15/065* | (2013.01) |
| *G10L 15/01* | (2013.01) |
| *G10L 15/06* | (2013.01) |
| *G10L 15/18* | (2013.01) |
| *G10L 15/26* | (2006.01) |
| *G10L 15/30* | (2013.01) |

(52) U.S. Cl.
CPC ............ *G10L 15/065* (2013.01); *G10L 15/01* (2013.01); *G10L 15/063* (2013.01); *G10L 15/18* (2013.01); *G10L 15/26* (2013.01); *G10L 15/30* (2013.01)

(58) Field of Classification Search
CPC ........ G10L 15/065; G10L 15/18; G10L 15/30
See application file for complete search history.

(56) References Cited

U.S. PATENT DOCUMENTS

2009/0210402 A1\* 8/2009 Yoo ...................... G06F 16/3338
2022/0189471 A1\* 6/2022 Sharifi .................... G10L 15/08

OTHER PUBLICATIONS

Aug. 8, 2022 Written Opinion (WO) of the International Searching Authority (ISA) and International Search Report (ISR) issued in International Application No. PCT/US2021/063513.
Yan Lu et al: "Collaborative learning between cloud and end devices: an empirical study on location prediction", Proceedings of the 4th ACM/IEEE Symposium on Edge Computing, Arlington, VA, USA, [Online] Nov. 7, 2019 (Nov. 7, 2019), pp. 139-151.

(Continued)

*Primary Examiner* — Ibrahim Siddo
(74) *Attorney, Agent, or Firm* — Honigman LLP; Brett A. Krueger; Grant Griffith

(57) ABSTRACT

A method includes receiving user queries directed toward a cloud-based assistant service. For each received user query directed toward the cloud-based assistant service, the method also includes extracting one or more attributes from the user query and logging the user query into one or more of a plurality of category buckets based on the one or more attributes extracted from the user query. The method also includes determining when at least one of the plurality of category buckets includes a threshold number of the user queries logged into the at least one category bucket, and when the at least one of the plurality of category buckets includes the threshold number of the user queries, generating a distilled model of the cloud-based assistant service. The distilled model of the cloud-based assistant service is configured to execute on one or more target client devices.

32 Claims, 5 Drawing Sheets

(56) References Cited

OTHER PUBLICATIONS

Takashima Ryoichi et al: "An Investigation of a Knowledge Distillation Method for CTC Acoustic Models", 2018 IEEE International Conference on Acoustics, Speech and Signal Processing (ICASSP), IEEE, Apr. 15, 2018 (Apr. 15, 2018), pp. 5809-5813.
Raden Mu'az Mun'im et al: "Sequence-Level Knowledge Distillation for Model Compression of Attention-based Sequence-to-Sequence Speech Recognition", arxiv.org, Cornell University Library, 201 Olin Library Cornell University Ithaca, NY 14853, Nov. 12, 2018 (Nov. 12, 2018).

* cited by examiner

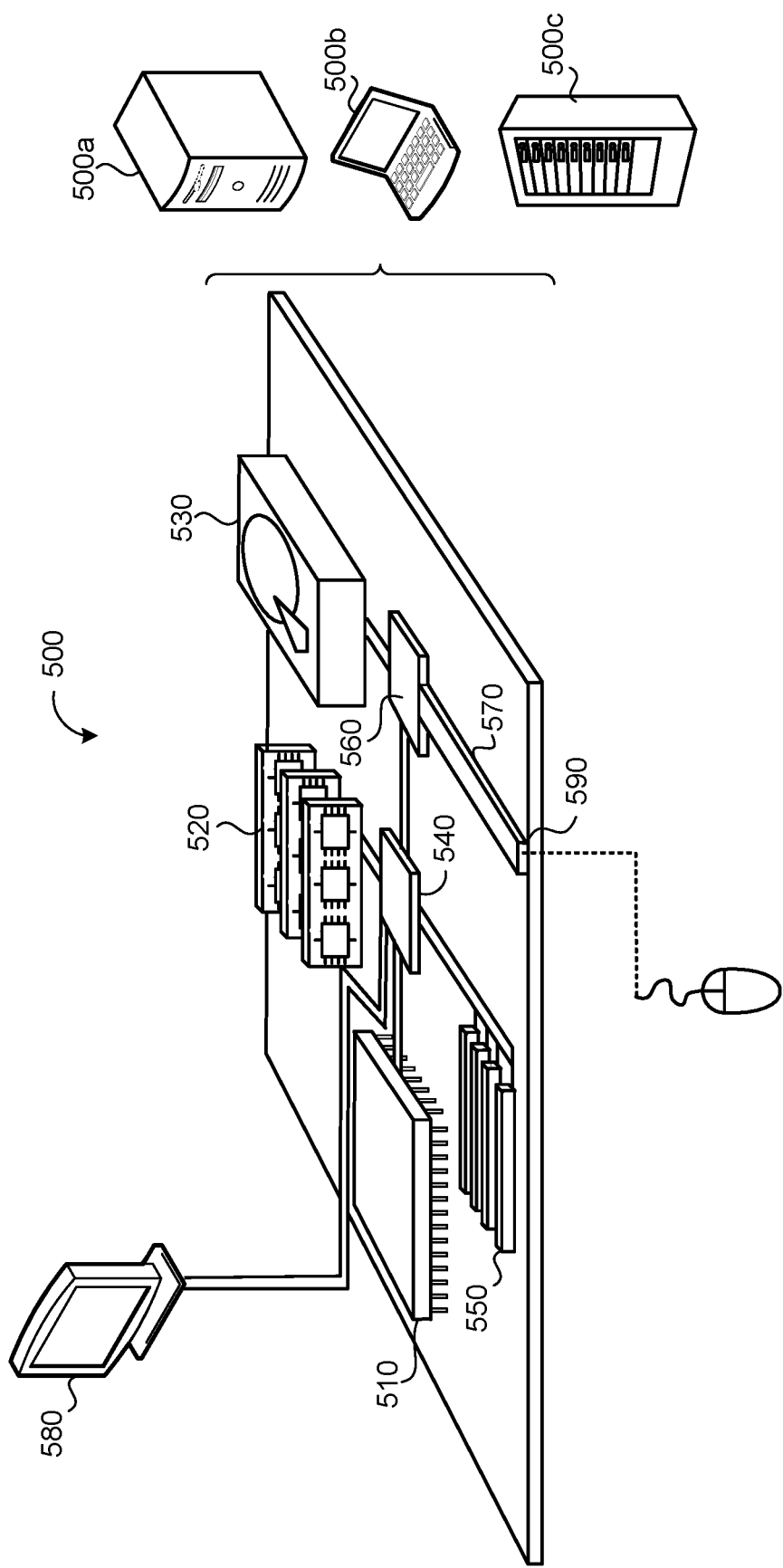

DISTILLING TO A TARGET DEVICE BASED ON OBSERVED QUERY PATTERNS

CROSS-REFERENCE TO RELATED APPLICATIONS

This U.S. patent application claims priority under 35 U.S.C. § 119(e) to U.S. Provisional Application 63/262,465, filed on Oct. 13, 2021. The disclosure of this prior application is considered part of the disclosure of this application and is hereby incorporated by reference in its entirety.

TECHNICAL FIELD

This disclosure relates to observing query patterns for distilling models to a target device.

BACKGROUND

Users frequently interact with voice-enabled assistant interfaces on smart devices such as phones, watches, and smart speakers/displays. These assistant interfaces enable users to get things done and find answers to questions they might have, all through natural, conversational interactions. Developers are creating assistant services that leverage voice-enabled assistant interfaces. For example, automatic speech recognition (ASR) models may recognize queries spoken by users and text-to-speech (TTS) models may generate synthetic speech for output to the users that conveys responses to the spoken queries. Generally, these assistant services execute in cloud computing environments that afford flexibility and provide extensive query processing capabilities. The drawbacks to cloud-based assistant services include consuming network bandwidth, increased latency, and reduced privacy since audio data characterizing the spoken queries must be transferred from a user device to the cloud-based service.

SUMMARY

One aspect of the disclosure provides a computer-implemented that when executed on data processing hardware causes the data processing hardware to perform operations that include receiving, from a plurality of client devices each associated with a respective user, user queries directed toward a cloud-based assistant service executing on the data processing hardware. For each received user query directed toward the cloud-based assistant service, the operations also include extracting one or more attributes from the user query and logging the user query into one or more of a plurality of category buckets based on the one or more attributes extracted from the user query. The operations also include determining when at least one of the plurality of category buckets includes a threshold number of the user queries logged into the at least one category bucket, and when the at least one of the plurality of category buckets includes the threshold number of the user queries, generating a distilled model of the cloud-based assistant service. Here, the distilled model of the cloud-based assistant service is configured to execute on one or more target client devices of the plurality of client devices.

Implementations of the disclosure may include one or more of the following optional features. In some implementations, the operations further include prompting a developer of the cloud-based assistant service to accept the generated distilled model for execution on the one or more target client devices and deploying the distilled model to the one or more of the target client devices when the developer accepts the generated distilled model. In these implementations, the operations may also include determining whether accuracy of the generated distilled model on an evaluation data set is within a threshold range of an accuracy of a teacher model on the evaluation data set. Here, prompting the developer of the cloud-based assistant service may include prompting the developer of the cloud-based assistant service when the accuracy of the generated distilled model on the evaluation data set is within the threshold range of the accuracy of the teacher model on the evaluation data set.

In some examples, the operations also include, for each received user query directed toward the cloud-based assistant service, processing, using an automatic speech recognition (ASR) model of the cloud-based assistant service, audio data characterizing the user query to generate a transcription of the user query. In these examples, extracting the one or more attributes from the user query includes performing query interpretation on the transcription of the user query to identify a query vertical type for the user query and logging the user query includes logging the user query into a corresponding one of the plurality of category buckets associated with the query vertical type identified for the user query. The one or more attributes extracted from the user query may include at least one of a device category and/or a device type associated with the client device the user query was received from, a query vertical type identified for the user query, a language and/or locale associated with a user that spoke the user query, a text-to-speech response generated by the cloud-based assistant service after fulfillment of the user query, or a transcription of the user query.

In some implementations, generating the distilled model of the cloud-based assistant service includes selecting a model configuration for the distilled model that satisfies memory and/or processing constraints of each of the one or more target client devices. In some additional implementations, generating the distilled model of the cloud-based assistant service may include: obtaining a set of training queries having attributes associated with the at least one of the plurality of category buckets that includes the threshold number of the user queries; generating, using a teacher model of the cloud-based assistant service, corresponding training labels for the training queries in the set of training queries; and training the distilled model on the set of training queries and the corresponding training labels generated for the training queries in the set of training queries. Here, at least a portion of the training queries in the set of training queries may include previous user queries selected from among the threshold number of the user queries logged into each of the at least one of the plurality of category buckets. Optionally, at least a portion of the training queries in the set of training queries may include new incoming queries having the attributes associated with the at least one of the plurality of category buckets that includes the threshold number of the user queries. Moreover, at least a portion of the training queries in the set of training queries may be selected from offline data samples having the attributes associated with the at least one of the plurality of category buckets that includes the threshold number of the user queries.

In some examples, after deploying the generated distilled model for execution on each of the one or more target devices, the operations further include: receiving, from each target client device executing the distilled model, federated analytics indicating attributes associated with new incoming queries processed by the distilled model executing on the corresponding target client device; logging the new incoming queries into one or more of the plurality of category buckets based on the federated analytics; determining when at least another one of the plurality of category buckets includes a threshold number of the user queries and the new user queries; and when the at least the other one of the plurality of category buckets includes the threshold number of the user queries and the new user queries, generating another distilled model of the cloud-based assistant service, the another distilled model of the cloud-based assistant service configured to execute on one or more target client devices of the plurality of client devices.

In some implementations, after deploying the generated distilled model for execution on each of the one or more target devices, the operations further include: receiving, from each target client device executing the distilled model, federated analytics indicating attributes associated with new incoming queries processed by the distilled model executing on the corresponding target client device; generating an updated distilled model by updating parameters of the distilled model based on the federated analytics received from each target device executing the distilled model; and deploying the updated distilled model for execution on each of the one or more target client devices. In these implementations, the federated analytics may be received from each target client device without receiving audio data characterizing any of the new incoming queries processed by the distilled model and without receiving transcriptions of the new incoming queries processed by the distilled model. The distilled model may include a speech recognition model, a text-to-speech model, or a natural language understanding (NLU) model.

Another aspect of the disclosure provides a system that includes data processing hardware and memory hardware in communication with the data processing hardware. The memory hardware stores instructions that when executed on the data processing hardware causes the date processing hardware to perform operations that include receiving, from a plurality of client devices each associated with a respective user, user queries directed toward a cloud-based assistant service executing on the data processing hardware. For each received user query directed toward the cloud-based assistant service, the operations also include extracting one or more attributes from the user query and logging the user query into one or more of a plurality of category buckets based on the one or more attributes extracted from the user query. The operations also include determining when at least one of the plurality of category buckets includes a threshold number of the user queries logged into the at least one category bucket, and when the at least one of the plurality of category buckets includes the threshold number of the user queries, generating a distilled model of the cloud-based assistant service. Here, the distilled model of the cloud-based assistant service is configured to execute on one or more target client devices of the plurality of client devices.

This aspect may include one or more of the following optional features. In some implementations, the operations further include prompting a developer of the cloud-based assistant service to accept the generated distilled model for execution on the one or more target client devices and deploying the distilled model to the one or more of the target client devices when the developer accepts the generated distilled model. In these implementations, the operations may also include determining whether accuracy of the generated distilled model on an evaluation data set is within a threshold range of an accuracy of a teacher model on the evaluation data set. Here, prompting the developer of the cloud-based assistant service may include prompting the developer of the cloud-based assistant service when the accuracy of the generated distilled model on the evaluation data set is within the threshold range of the accuracy of the teacher model on the evaluation data set.

In some examples, the operations also include, for each received user query directed toward the cloud-based assistant service, processing, using an automatic speech recognition (ASR) model of the cloud-based assistant service, audio data characterizing the user query to generate a transcription of the user query. In these examples, extracting the one or more attributes from the user query includes performing query interpretation on the transcription of the user query to identify a query vertical type for the user query and logging the user query includes logging the user query into a corresponding one of the plurality of category buckets associated with the query vertical type identified for the user query. The one or more attributes extracted from the user query may include at least one of a device category and/or a device type associated with the client device the user query was received from, a query vertical type identified for the user query, a language and/or locale associated with a user that spoke the user query, a text-to-speech response generated by the cloud-based assistant service after fulfillment of the user query, or a transcription of the user query.

In some implementations, generating the distilled model of the cloud-based assistant service includes selecting a model configuration for the distilled model that satisfies memory and/or processing constraints of each of the one or more target client devices. In some additional implementations, generating the distilled model of the cloud-based assistant service may include: obtaining a set of training queries having attributes associated with the at least one of the plurality of category buckets that includes the threshold number of the user queries; generating, using a teacher model of the cloud-based assistant service, corresponding training labels for the training queries in the set of training queries; and training the distilled model on the set of training queries and the corresponding training labels generated for the training queries in the set of training queries. Here, at least a portion of the training queries in the set of training queries may include previous user queries selected from among the threshold number of the user queries logged into each of the at least one of the plurality of category buckets. Optionally, at least a portion of the training queries in the set of training queries may include new incoming queries having the attributes associated with the at least one of the plurality of category buckets that includes the threshold number of the user queries. Moreover, at least a portion of the training queries in the set of training queries may be selected from offline data samples having the attributes associated with the at least one of the plurality of category buckets that includes the threshold number of the user queries.

In some examples, after deploying the generated distilled model for execution on each of the one or more target devices, the operations further include: receiving, from each target client device executing the distilled model, federated analytics indicating attributes associated with new incoming queries processed by the distilled model executing on the corresponding target client device; logging the new incoming queries into one or more of the plurality of category buckets based on the federated analytics; determining when at least another one of the plurality of category buckets includes a threshold number of the user queries and the new user queries; and when the at least the other one of the plurality of category buckets includes the threshold number of the user queries and the new user queries, generating another distilled model of the cloud-based assistant service, the another distilled model of the cloud-based assistant service configured to execute on one or more target client devices of the plurality of client devices.

In some implementations, after deploying the generated distilled model for execution on each of the one or more target devices, the operations further include: receiving, from each target client device executing the distilled model, federated analytics indicating attributes associated with new incoming queries processed by the distilled model executing on the corresponding target client device; generating an updated distilled model by updating parameters of the distilled model based on the federated analytics received from each target device executing the distilled model; and deploying the updated distilled model for execution on each of the one or more target client devices. In these implementations, the federated analytics may be received from each target client device without receiving audio data characterizing any of the new incoming queries processed by the distilled model and without receiving transcriptions of the new incoming queries processed by the distilled model. The distilled model may include a speech recognition model, a text-to-speech model, or a natural language understanding (NLU) model.

The details of one or more implementations of the disclosure are set forth in the accompanying drawings and the description below. Other aspects, features, and advantages will be apparent from the description and drawings, and from the claims

DESCRIPTION OF DRAWINGS

FIG. 5 is a schematic view of an example computing device that may be used to implement the systems and methods described herein.

Like reference symbols in the various drawings indicate like elements.

DETAILED DESCRIPTION

Figure 1:
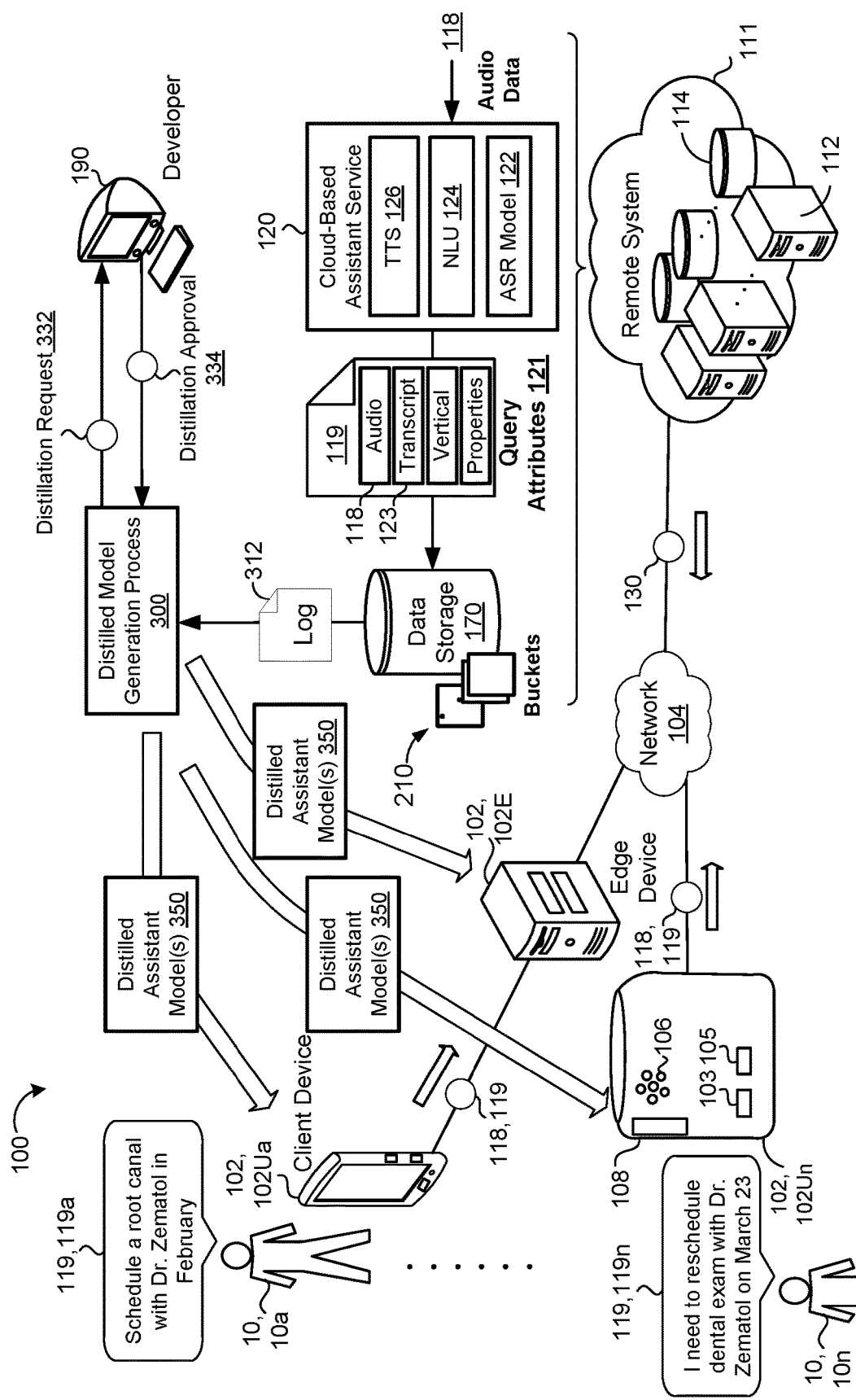
FIG. 1 is a schematic view of an example system for distilling assistant models to client devices based on user queries directed toward a cloud-based assistant service.

Users frequently interact with voice-enabled assistant interfaces on smart devices such as phones, watches, and smart speakers/displays. These assistant interfaces enable users to get things done and find answers to questions they might have, all through natural, conversational interactions. Developers are creating assistant services that leverage voice-enabled assistant interfaces. For example, automatic speech recognition (ASR) models may recognize queries spoken by users and text-to-speech (TTS) models may generate synthetic speech for output to the users that conveys responses to the spoken queries. Generally, these assistant services execute in cloud computing environments that afford flexibility and provide extensive query processing capabilities. The drawbacks to cloud-based assistant services include consuming network bandwidth, increased latency, and reduced privacy since audio data characterizing the spoken queries must be transferred from a user device to the cloud-based service.

Implementations herein are directed toward a cloud-based assistant service that aggregates user queries from client devices and is capable of detecting when any components/models of the cloud-based assistant service are capable of existing on some or all of the client devices based on patterns/attributes identified in the user queries. For instance, when user queries reveal that a vast majority of the user queries belong to a particular query vertical type, the cloud-based assistant service may determine to generate a distilled speech recognition model and/or a distilled natural language understanding (NLU) module that is optimized to recognize and/or interpret queries within that query vertical type. To illustrate, a developer may create a voice- and cloud-based assistant service tailored to run on a smart watch product, whereby spoken queries captured by the smart watch are recognized via a cloud-based speech recognition model. By extracting attributes from queries received and processed by the cloud-based assistant service, the cloud-based assistant service may learn that almost all the queries are fitness-related (e.g., belong to a fitness query vertical type). As such, the service may distill custom speech recognition and NLU models tailored for recognizing and understanding fitness-related queries. Accordingly, the service may deploy these distilled custom models for execution directly on the smart watches to lead to improved latency and privacy for customers/users of the developer.

Even further, multiple distilled speech recognition models may be generated that each have a configuration suitable for a different respective client device type (a particular make/model of smart phone) the model will execute on. Client device type and category (e.g., phone, smart speaker, smart watch, etc.) associated with a client device issuing a query to the cloud-based assistant service may be extracted as an attribute of the query. The client devices now executing distilled speech recognition models provide an improved user experience in terms of latency, bandwidth usage, and privacy since potentially high-dimensional and sensitive audio data characterizing the queries can now be processed locally on the client devices without the need to use a cloud-based speech recognition model associated with the cloud-based assistant service to process the queries. As used herein, client devices may include any user computing device as well as on-premises devices of customers of the cloud-based assistant service.

Referring to FIG. 1, in some implementations, and example system 100 includes multiple client devices 102 associated with one or more users 10 and in communication with, via a network 104, a cloud-based assistant service 120 executing on a remote system 111. The client devices 102 may correspond to user computing devices 102Ua-b and edge devices 102E. Each user computing devices 102U may include a mobile phone, computer (laptop or desktop), tablet, smart speaker/display, smart appliance, smart headphones, wearable, vehicle infotainment system, etc., and is equipped with data processing hardware 103 and memory hardware 105. Each user computing device 102U includes or is in communication with one or more microphones 106 for capturing utterances from the respective user 10. Each edge device 102E may include any on-premises device (e.g., router, routing switch, integrated access device, multiplexer, private server, etc.) associated with an enterprise or entity that provides the user computing devices 102U access to the remote system 111 via the network. The remote system 111 may be a single computer, multiple computers, or a distributed system (e.g., a cloud environment) having scalable/elastic computing resources 112 (e.g., data processing hardware) and/or storage resources 114 (e.g., memory hardware).

The cloud-based assistant service 120 provides a digital assistant interface to the client devices 102 for performing actions specified by user queries 119 captured by the client devices 102. While examples herein describe the user queries 119 as spoken utterances captured in streaming audio by the microphones 106 of the client devices 102, some of the user queries 119 may similarly include textual queries input to the client devices by the respective users without departing from the scope of the present disclosure. Here, a query 119 spoken by a user 10 may be captured by the client device 102 in streaming audio and specify an action/operation/task for the cloud-based assistant service 120 to perform. In this sense, the users 10 may have conversational interactions with the cloud-based assistant service 120 executing on the remote system to perform computing activities or to find answers to questions.

The cloud-based assistant service 120 generally facilitates receiving audio data 118 corresponding a spoken query 119 captured by a microphone 106 of the user computing devices 102U, coordinating speech processing on the audio data 118, performing semantic interpretation on the audio data 118 to identify the query 119 to perform an action, and fulfilling the action. When the microphone 106 of the device 102 captures an utterance in streaming audio and converts the audio into audio data 118, the audio data 118 corresponding to the user query is transmitted over the network 104 to the cloud-based assistant service 120 for performing speech recognition and semantic interpretation to identify and ultimately fulfill the query 119 conveyed in the spoken utterance. In the example shown, the assistant service 120 executes a speech recognition (ASR) model 122 configured to generate speech recognition results on received audio data 118 characterizing a query 119 spoken by a user 10, a natural language understanding (NLU) model 124 configured to perform semantic interpretation on the speech recognition results to identify the query 119, and a text-to-speech (TTS) model 126 configured to generate synthesized speech representations from input text conveying responses 130 to the query 119 fulfilled by the assistant service 120. The user devices 102U may share federated analytics that aggregate the audio data 118 and/or transcription characterizing the query 119 so that the audio data 118 and/or transcription is not attributable to any specific user device 102U or user associated therewith.

In some implementations, a developer 190 creates the cloud-based assistant service 120 to provide a digital assistant interface that interfaces with one or more applications on the devices 102 or accessible to the devices 102. An application generally refers to any application that is configured to run on the devices 102. Some types of applications include media applications (e.g., video streaming applications, audio streaming applications, media player applications, media gallery applications, etc.), word processing applications, navigation applications, social media applications, communication applications (e.g., messaging applications, email applications, etc.), financial applications, organizational applications (e.g., address book applications), retail applications, entertainment applications (e.g., news applications, weather applications, sport applications), casting applications, etc. The assistant service 120 may be integrated with these applications to enable the users 10 to control applications on the device 110 using his or her voice. For example, the assistant service 120 may provide an application programming interface (API) or any other type of program or application configured to execute the functionality of the applications.

In the example shown, the developer 190 creates the cloud-based assistant service 120 for a dental practice where the cloud-based assistant service 120 provides an appointment booking assistant interface for the dental practice. Here, at least some of the users 10, 10a—n correspond to patients of the dental practice that use their corresponding client devices 102, 102Ua-Un to access the cloud-based assistant service 120 to schedule dental-related appointments for procedures at the dental practice. The user computing devices 102U may access the cloud-based assistant service 120 via a corresponding application that the users 10 download on to their device 102U, a general assistant application pre-installed on the device, or a web-based application by entering a uniform resource locator (URL) associated with the dental practice. In some examples, some of the users 10 correspond to employees/staff of the dental practice that also access the assistant service 120 to review/confirm appointments booked by patients 10 and/or communicate secure messages with the patients. As such, the edge device 102E may correspond to a private server/computer of the dental practice that the employees/staff connect with to gain access to the cloud-based assistant service 120.

Continuing with the example, a first patient 10a speaks (or optionally types) a query 119a "Schedule a root canal with Dr. Zematol in February" that is captured in streaming audio by the microphone 106 of the client device 102Ua and converted into corresponding audio data 118 that the client device 102Ua transmits to the cloud-based assistant service 120 via the network 104. Optionally, the edge device 102E may first receive the audio data 118 and facilitate transmission of the audio data 118 to the assistant service 120. As such, the cloud-based ASR model 122 performs speech recognition on the audio data 118 to generate a transcription 123 and the NLU model 124 performs semantic interpretation on the transcription 123 to identify the query 119a, and more particularly, identify an action that the query 119a specifies for the assistant service 120 to perform. Of course, the NLU model 124 may receive textual queries 119 input by users directly without the need of the ASR model 122. Here, the NLU model 124 identifies the first query 119a indicating that a particular patient 10a would like to see if a schedule for the dentist "Dr. Zematol" has any openings in the month of February to perform a root canal. The assistant service 120 may thereby access the dentist's schedule, retrieve available time slots in February for performing root canal procedures, and provide a response 130 back to the client device 102Ua of the patient 10a indicating the available time slots Dr. Zematol has in February for performing root canals. The response 130 may include a text-to-speech response that the client device 102Ua outputs (via an acoustic speaker 108) as synthesized speech conveying the available time slots and prompting the patient 10a to select one of the time slots. In this scenario, the TTS model 126 may convert input text for the response 130 into the synthesized speech representation and the assistant service 120 may transmit the synthesized speech representation as a corresponding audio file to the client device 102Ua for audible output via a speaker 108. Additionally or alternatively, the response 130 may include a textual representation that is graphically displayed on a graphical user interface of the client device 102 that enables the patient 10a to select one of the available time slots to book the root canal appointment.

FIG. 1 also shows another patient 10n speaking another query 119n "I need to reschedule dental exam with Dr. Zematol on March 23" that is captured in streaming audio by the microphone 106 of the client device 102Un and converted into corresponding to audio data 118 that the client device 102Un transmits to the cloud-based assistant service via the network 104. The cloud-based assistant service 120 similarly executes the cloud-based ASR and NLU models 122, 124 to transcribe the audio data 118 and identify the other query 119n indicating that the other patient 10n would like to schedule his/her dental exam with Dr. Zematol on March 23. In this scenario, the assistant service 120 may cancel the existing appointment the patient 10n has with Dr. Zematol on March 23 and provide a corresponding response 130 confirming that the appointment has been canceled. The response 130 may additionally include available dates/times for the patient 10n to select from to reschedule the dental exam with the dentist, Dr. Zematol.

For each received user query 119, the cloud-based assistant service 120 extracts one or more attributes 121 from the user query 119, and based on the one or more extracted attributes 121, logs the user query 119 into one or more of a plurality of category buckets 210 stored on data storage 170. The data storage 170 may reside on the storage resources (e.g., memory hardware) of the remote system 111. Attributes 121 extracted from the user query 119 may include the audio data 118 characterizing the query 119, the transcription 123 of the query 119, a query vertical type identified for the query 119, and/or one or more other properties associated with the query 119. For instance, the NLU model 124 may perform semantic interpretation on the transcription 123 of the query 119 generated by the ASR model 122 to identify a query vertical type for the user query. As a result, logging the user query 119 includes logging the user query 119 into a corresponding one of the plurality of category buckets 210 associated with the query vertical type identified for the user query 119. In the example, the query vertical type attribute 121 extracted from each of the queries 119a, 119n indicates a vertical associated with appointment/scheduling booking, and may even be more specific to indicate that the vertical is associated with scheduling dentist visit appointments.

The attributes 121 extracted from each query may further include a device category and/or a device type associated with the client device the user query was received from. For instance, the device category associated with the client device 102Un the query 119n was received from may include a smart speaker while the device category associated with the client device 102 the first query 119a was received from may include a smart phone. Moreover, the attribute 121 may specify the device type indicating a make/model of the client device. For instance, the make and model of the type of smart phone the user 10a used to issue the query 119a may be specified by the device type attribute 121.

In some examples, the one or more attributes 121 extracted from the query 119 include a language and/or locale associated with the user 10 that spoke the user query 119. Here, the language and/or locale may be extracted from any combination of the audio data 118, the transcription 123, or some identifier indicating the language and/or locale of the spoken query 119. In additional examples, a front-end audio processing component and/or the ASR model 122 extracts background noise levels from the audio 118 containing the user query 119 as one of the query attributes 121.

The query attributes 121 may further include attributes associated with the TTS response 130 generated by the assistant service after fulfillment of the user query 119. The attributes 121 associated with the TTS response 130 may include at least one of: the text input conveying the response 130 that is to be converted by the TTS model 126 into the corresponding synthesized speech representation; an audio file of the synthesized speech representation, or TTS modeling parameters such as prosody/style features, language or voice characteristics the TTS model 126 was conditioned on for generating the synthesized speech representation.

As incoming user queries 119 are logged into the corresponding category buckets 210, the assistant service 120 maintains a query categorization log 312 containing the number of queries 119 logged into each of the category buckets 210. A distilled model generation process 300 analyzes the query categorization log 312 to identify patterns/similarities among the user queries 119 for opportunistically generating one or more distilled assistant models 350 for execution on one or more target client devices among the plurality of client devices 102. In some examples, the distilled model generation process 300 continuously analyzes the query categorization log 312 on an ongoing basis as the log 312 dynamically updates each time a new query 119 is logged into one or more category buckets 210 based on the attributes 121 extracted therefrom. In other examples, the process 300 analyzes the query categorization log 312 during periodic intervals (e.g., every hour, daily, weekly, etc.).

Implementations herein are directed toward the distilled model generation process 300 inspecting the query categorization log 312 to determine when at least one of the plurality of category buckets 210 includes a threshold number of the user queries 119 logged into the at least one category bucket 210. When the at least one of the plurality of category buckets 210 includes the threshold number of user queries 119, the distilled model generation process 300 may generate the one or more distilled models 350 of the cloud-based assistant service 120. For example, the process 300 may generate a distilled ASR model 350 trained to recognize common terms/phrases associated with the query vertical type (e.g., appointment booking) and/or vocabulary (e.g., dentist terminology) and proper nouns (e.g., Dr. Zematol) associated with a customer (e.g., dentist office) of the assistant service. While a threshold number of user queries 119 is used as a condition, other metrics such as a threshold number of queries over a designated time window or some fraction of queries. In some examples, the process 300 may generate multiple distilled ASR models 350 each having a respective model configuration that satisfies memory and/or processing constraints for the device category and/or device type associated with the target client devices 102 that will execute the distilled model 350 For instance, the process 300 may generate a first distilled ASR model 350 having a first model configuration for target client devices that include smart phones and generate a second distilled ASR model 350 having a different second model configuration for target client devices that include smart speakers.

In some scenarios, the distilled model generation process 300 transmits a distillation request 332 to the developer 190 requesting approval from the developer 190 before generating the distilled assistant model 350. In other scenarios, the process 300 transmits the distillation request 332 to the developer 190 after generating the distilled assistant model 350, whereby the distillation request 332 prompts the developer 190 of the cloud-based assistant service 120 to accept the generated distilled assistant model 350 for execution on the one or more target client devices 102. Here, the developer 190 may return a distillation approval 334 that indicates the developer accepts the generated distilled assistant model 350 for execution on the target client devices 102 specified in the distillation request 332. By the same notion, the developer 190 may reject deploying the generated distilled assistant model 350 for execution on the target devices.

In the scenario when the distilled assistant model 350 includes a distilled ASR model, each target client device 102 may perform speech recognition on audio data characterizing queries spoken by the respective user 10 of the client device 102 without having to transmit the audio data over the network 104 for processing by the cloud-based ASR model 122. In addition to improved latency and bandwidth reduction, executing the distilled ASR model 350 on each of the target client devices 102 also preserves user privacy since no potentially sensitive audio recordings of the user 10 are transmitted over the network 104 and shared with the cloud-based assistant service 120. Distilled NLU and TTS models may also be generated and deployed for execution on the target client devices 102 to potentially eliminate the need for the cloud-based assistant service 120 to execute the cloud-based ASR, NLU, and/or TTS models 122, 124, 126 for processing user queries. In some scenarios, when a distilled model 350 executing on a target client device is unable to process an incoming user query, the target client device 102 may hand-off the query 119 (i.e., transmit the audio data 118 and/or transcription 123 of the user query) to the cloud-based assistant service 120 that is capable of running more and much larger cloud-based models 122, 124, 126 to process the query 119.

In some examples, after deploying the generated distilled model 1540 for execution on each of the one or more target devices 102, the cloud-based assistant service 120 receives, from each target client device 102 executing the distilled assistant model 350, federated analytics indicating attributes associated with new incoming queries 119 processed by the distilled assistant model 350 executing on the corresponding target client device 102. Here, the federated analytics may indicate the same attributes extracted from the new queries 119 as the attributes 121 extracted from the queries 119 as discussed above. However, the federated analytics received from each target device aggregate the audio data and transcriptions characterizing any of the new incoming queries processed by the distilled model so that the audio data and transcriptions are not attributable to any specific user associated with the target devices. The assistant service 120 may now log the new incoming queries into one or more of the plurality of category buckets 210 based on the federated analytics and the distilled model generation process 300 may analyze the query categorization log 312 to determine when at least another one of the plurality of category buckets 210 includes a threshold number of the user queries and the new user queries. As discussed previously, the distilled model generation process 300 may generate another distilled model 350 of the cloud-based assistant service 120 for execution on the one or more target client devices of the plurality of client devices 102.

The cloud-based assistant service 120 may additionally or alternatively use the federated analytics received from the target client devices for generating an updated distilled model by updating parameters of the distilled model. Here, the federated analytics may additionally include performance metrics for the distilled assistant model during execution on the target client devices 102. In these scenarios, the cloud-based assistant service 120 may collect the federated analytics shared by each target client device and determine when the distilled model can be updated/improved. Accordingly, the assistant service 120 may deploy the updated distilled model for execution on each of the one or more target client devices. In some examples, the assistant service 120 sends the parameter updates to each of the target client devices and the target client devices 102 generate the updated distilled model locally by using the parameter updates to update the parameters of the distilled model executing thereon.

Figure 2:
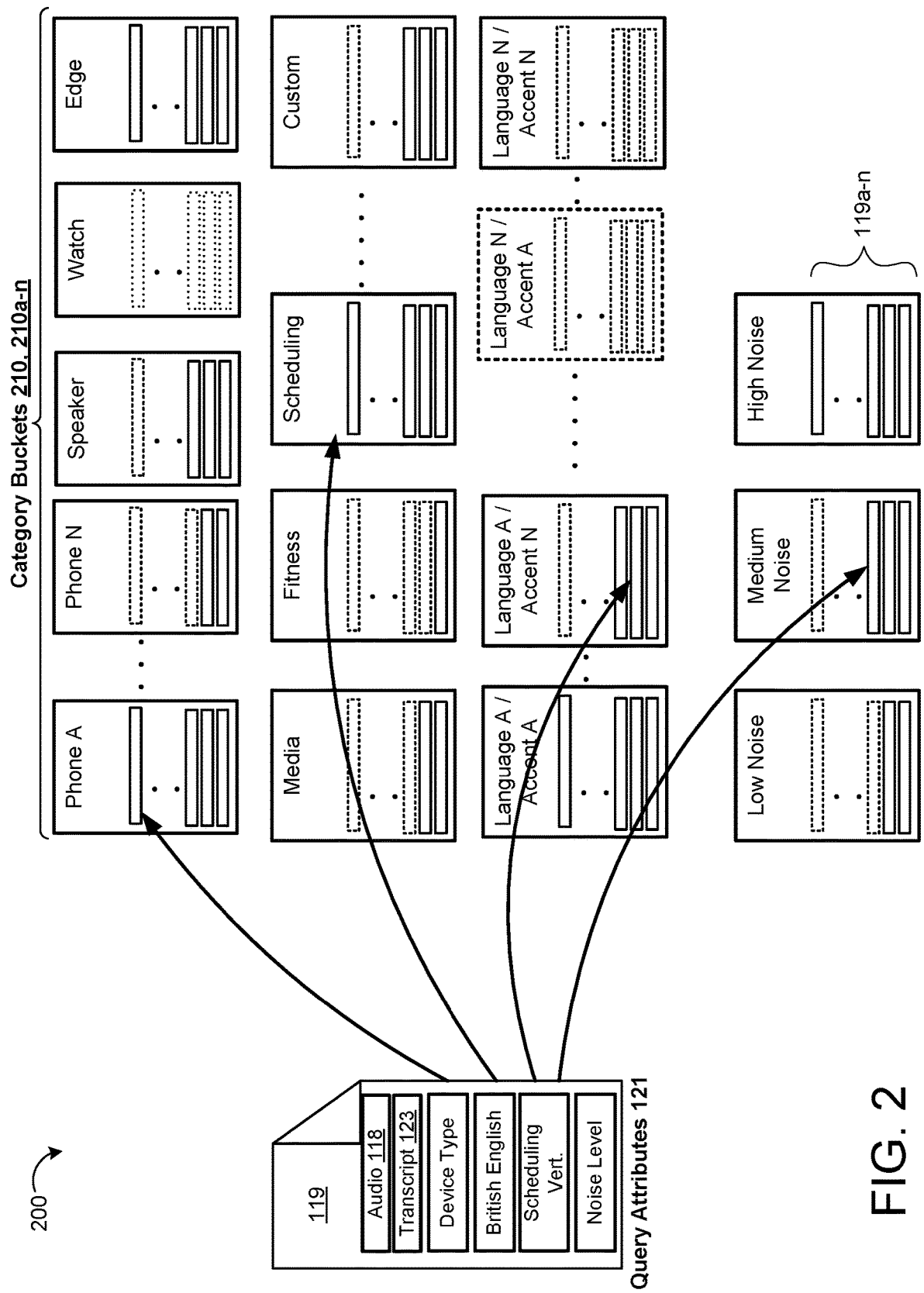
FIG. 2 is a schematic view of logging a user query to one or more category buckets based on attributes extracted from the user query.

FIG. 2 shows a schematic view of logging an example query 119 into one or more category buckets 210, 210a-n based on one or more query attributes 121 extracted from the query 119. The category buckets 210 may be pre-populated, defined by the developer 190, dynamically generated by the assistant service 120 based on observed patterns as incoming user queries are received, or some combination thereof. As described above, the one or more query attributes extracted from the user query 119 may include at least one of the following possible attribute types: a device category and/or a device type associated with the client device 102 the query was received from; a query vertical type identified for the user query; a language and/or locale associated with the user that spoke the user query; background noise levels in the audio data 118 containing the user query 119; a TTS response 130 generated by the cloud-based assistant service 120 after fulfillment of the user query 119; the audio data 118 characterizing the user query; or a transcription 123 of the user query.

Each category bucket 210 in the plurality of category buckets 210a—n not only represents a respective category among the different possible attribute types that can be extracted from a user query, but also represents a particular classification within the respective category. For instance, a first group of the category buckets 210 depicted along the top row of FIG. 2 includes category buckets 210 representing different device categories such as, but not limited to, smart phones, smart speakers, smart watches, edge devices, smart headphones (not shown), or vehicle infotainment devices (not shown). Additionally, some of the category buckets 210 in this group are associated with particular device types indicating different makes/models of smart phones (e.g., Phone A through Phone N) that all fall into a same device category (e.g., smart phone) to thereby provide a more granular classification for logging user queries 119 received by the cloud-based assistant service 120. Moreover, the particular device types could further classify particular operating systems or versions of operating systems. Each device category may be associated with different constraints on available computing/memory resources. Similarly, specific device types within a given device category may have different constraints in terms of disk space, memory, and or processing capacity. As will described in greater detail below, generating distilled assistant models 350 for execution on target client devices requires selecting model configurations (i.e., model architecture, number of weights/parameters assigned to the model, etc.) for the distilled assistant models 350 based on memory and/or processing constraints of the client target devices.

With continued reference to FIG. 2, a second group of the category buckets 210 depicted along the second row from the top of FIG. 2 includes category buckets 210 associated with different query vertical types. For instance, the category buckets 210 within this second group may include a bucket for logging user queries directed to the assistant service 120 that are media related (e.g., "Assistant, stream my music playlist" or "Assistant, pause the movie"), as well as other buckets for logging user queries that are fitness related and for logging user queries related to scheduling. The number of category buckets representing different query vertical types is non-limiting and may include buckets associated with query vertical types related to navigation (e.g., "Navigate to Uncle John's house in Sebastopol, CA"), word processing, messaging (e.g., "Send message to Mom, 'I'm running late'"), and shopping (e.g., "Re-order cold brew coffee for delivery") to name a few. The developer 190 may further create additional custom category buckets based on custom query vertical types defined by the developer that may be of particular interest to the developer 190 for logging incoming user queries. By the same notion, the assistant service 120 may dynamically create custom query vertical types on the fly. For instance, while logging queries into the category bucket related to the query vertical type of scheduling/appointment booking, the assistant service 120 may observe that the transcripts 123 in a large portion of the these queries include dentistry terminology as well as an uncommon proper noun (e.g., the name "Dr. Zematol"). In fact, the assistant service 120 may simply pass the transcripts 123 for all the queries 119 through a language model to ascertain frequencies of terminology/proper nouns and identify specific terms/phrases/proper nouns unique to the assistant service 120 that have high frequencies. Accordingly, the assistant service 120 may dynamically create one or more custom category buckets associated with learned query vertical types and/or terminology unique to the assistant service 120.

A third group of the category buckets 210 depicted along the third row from the top of FIG. 2 includes category buckets 210 representing different languages and/or accents associated with users that spoke the incoming user queries 119 directed toward the cloud-based assistant service. For example, the third group may include category buckets for different languages A-N, as well as different accents/dialects within each of the different languages. For instance, there may include multiple category buckets 210 representing language A corresponding English, whereby each category bucket 210 represents a particular accent/dialect of English (e.g., American English, American English with southern accent, British English, British English with Manchester accent, etc.).

A fourth group of the category buckets 210 represented along the bottom row of FIG. 2 includes category buckets 210 representing different background noise levels in the audio data 118 containing the user queries 119. For instance, this fourth group of category buckets 210 may include three buckets for classifying background noise levels in incoming queries as low, medium, or high. That is, the category bucket representing the low background noise level may include any user queries 119 having audio data with background noise levels less than a minimum noise level threshold, while the category bucket representing the high background noise level may include any user queries 119 having audio data with background noise levels greater than a maximum noise level threshold. Here, the maximum noise level threshold is greater than the minimum noise level threshold. Similarly, the category bucket representing medium background noise level may include any user queries 119 having audio data with background noise levels greater than or equal to the minimum noise level threshold and less than or equal to the maximum noise level threshold. There may exist more/less than three category buckets for representing different ranges of background noise levels.

FIG. 2 depicts a user query 119 received by the cloud-based assistant service 120 and having query attributes 121 extracted therefrom that include the audio data 118, the transcript 123 generated by the cloud-based ASR model 122, a device type indicator indicating the make/model of the client device the query 119 was received from, a language/accent identifier (e.g., British English) indicating the language and/or accent associated with the user that spoke the user query, a query type vertical indicator indicating the query vertical type (e.g., Scheduling vertical), and a noise level indicator indicating a background noise level (e.g., in decibels (Db)) of the audio data 118 containing the user query 119 captured by the client device 102. Based on the extracted query attributes 121, the assistant service 120 logs the user query 119 into multiple category buckets 210 each representing a particular classification within a respective category among the different attribute types extracted from the user query 119. For example, the query 119 logs into each of the following category buckets: the category bucket representing the device type of Phone A; the category bucket representing the query vertical type related to scheduling/appointment booking; the category bucket representing Language A/Accent N associated with British English speakers; and the category bucket representing medium background noise levels. Notably, the category bucket representing the device type of Phone A also represents the device category of smart phones and the category bucket representing British English also broadly represents an English language query. Solid rectangles within each category bucket 210 may denote a logged query 119, while dashed rectangles may denote slots available for logging queries. A bucket with all solid rectangles may indicate that the category bucket includes a threshold number of queries 119.

Figure 3:
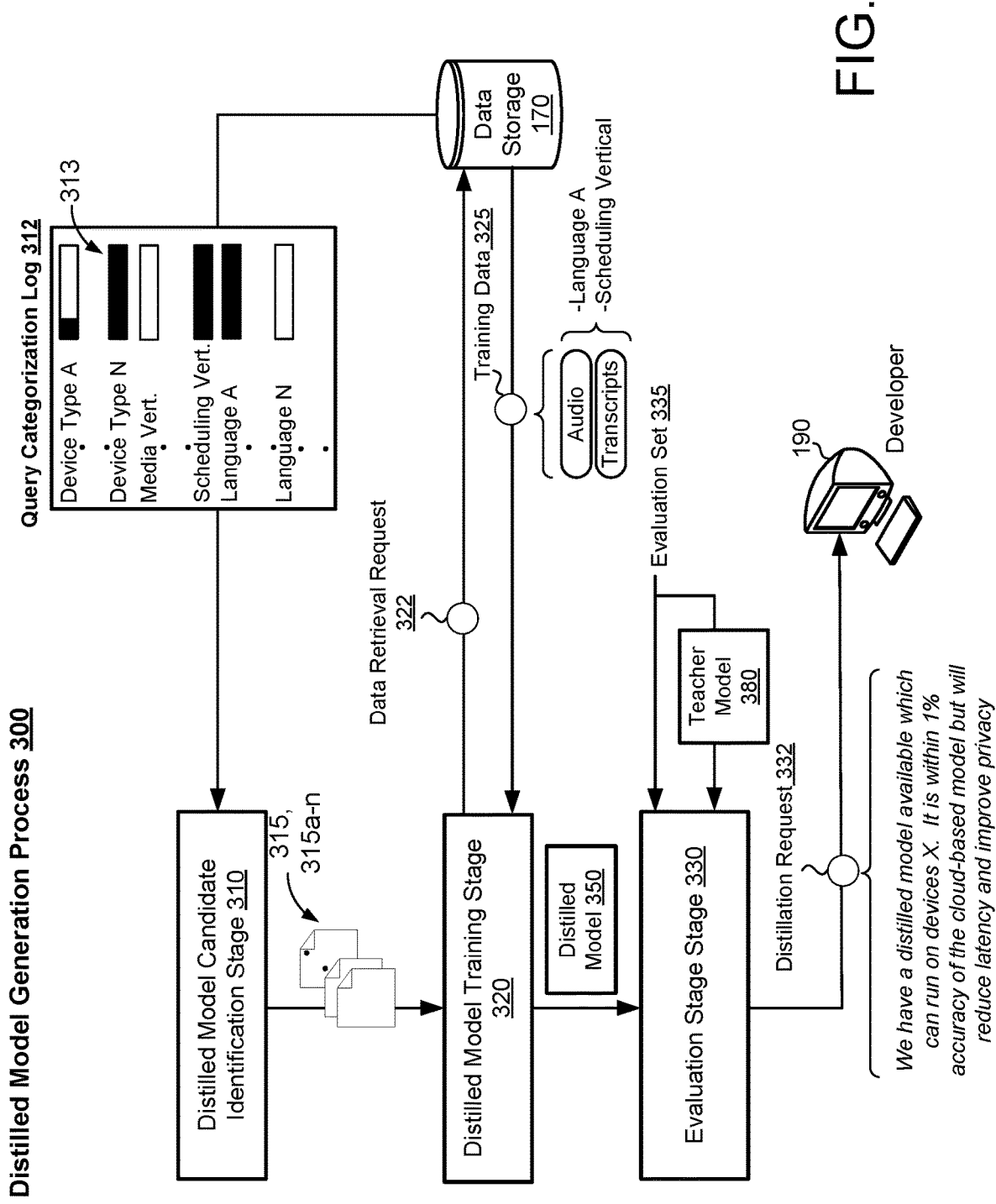
FIG. 3 is a schematic view of an example distilled model generation process for generating one or more distilled assistant models for the cloud-based assistant service of FIG. 1.

FIG. 3 illustrates an example of the distilled model generation process 300 of FIG. 1 for generating one or more distilled assistant models 350 for execution on one or more target client devices 102. The process 300 includes a distilled model candidate identification stage ('candidate identification stage') 310, a distilled model training stage ('training stage') 320, and an evaluation stage 330.

During the identification stage 310, the process 300 receives the query categorization log 312 from the data storage 170 indicating a number of user queries 119 received by the assistant service 120 that are logged into each corresponding category bucket among the plurality of category buckets 210. For instance, FIG. 3 shows the query categorization log 312 having a query count indicator 313 for each category bucket that indicates the number of queries 119 logged into the corresponding category bucket 210. The process 300 analyzes/inspects the query categorization log 312 to determine when at least one of the plurality of category buckets 210 includes a threshold number of the user queries 119 logged into the corresponding at least one category bucket 210. The fully-shaded query count indicator 313 indicates that a threshold number of queries are logged into the corresponding category bucket 210 while an entirely unshaded query count indicator 313 indicates that zero queries have been logged into the corresponding category bucket 210. In the example shown, the query categorization log 312 shows that the category buckets 210 representing the device type N, the query vertical type related to scheduling/appointment booking, and the spoken query language A each include the threshold number of queries as indicated by the fully-shaded query count indicators 313. Notably, the entirely unshaded query count indicators 313 for the category buckets 210 representing the media query vertical type and Language N reveal that none of the user queries 119 received at the cloud-based assistant service were spoken in Language N or included media-related queries.

Based on the process 300 determining that the category buckets 210 representing the device type N, the query vertical type related to scheduling/appointment booking, and the spoken query language A each include the threshold number of queries 119, the distilled model candidate identification stage 310 identifies one or more distilled assistant model candidates 315, 315a—n of the cloud-based assistant service 120. The distilled assistant model candidates 315 identified during the identification stage 310 may include any combination of one or more distilled ASR model candidates, one or more NLU model candidates, one or more TTS model candidates, or any other types of models or components used by the cloud-based assistant process during the query processing pipeline. For instance, other types of models/components that can be distilled to target devices may include language models and/or speech processing models for processing background noise levels and/or noise cancellation.

The identification stage 310 may identify multiple distilled assistant model candidates related to a same type of model (e.g., ASR model) where each candidate is adapted for use on a respective set of target devices associated with a respective device category or particular device type. Optionally, multiple candidates related to the same type of model and intended for use on the same set of target devices may be identified and eventually evaluated to select a top candidate for distillation to target client devices. As such, the identification stage may select a respective model configuration for each distilled assistant model candidate 315 that satisfies memory and/or processing constraints of each of the one or more target client devices intended to execute the distilled model candidate 315. For instance, the identification stage 310 may obtain (e.g., look-up) memory and/or processing constraints for the device type N and select a model configuration for a distilled assistant model candidate 315 intended to execute on the device type N. Here, the selecting of the model configuration may include assigning a number of model weights to the corresponding model candidate 315 based on available memory of the device type N and/or assigning a number of operations that can be performed by the corresponding model candidate 315 based on processing capacity of the device type N. Additionally or alternatively, selecting model configurations for model candidates 315 to be distilled to target devices may include assigning model weights and/or operation constraints based on a lowest common denominator in terms of available memory and/or processing constraints for the target devices.

During the training stage 320, the distilled model generation process 300 generates a corresponding distilled assistant model 350 for each distilled assistant model candidate 315 identified during the identification stage 310. In some implementations, for each distilled assistant model candidate 315, the process 300 obtains a set of training queries 325 having query attributes 321 associated with one or more of the category buckets 210 that include the threshold number of queries 119. For example, when the distilled assistant model candidate 315 includes a distilled ASR model candidate adapted for recognizing terms/phrases related to scheduling/booking and spoken in Language A, the training stage 320 may issue a data retrieval request 332 to retrieve a set of training queries 325 stored on the data storage 170 that were spoken in Language A and belong to the query vertical type related to scheduling/appointment booking. Here, at least a portion of the training queries in the set of training queries 325 may include previous user queries selected from among the threshold number of user queries logged into each of the category bucket s210 representing the query vertical type related to scheduling/appointment booking and queries spoken in Language A. At least a portion of the training queries in the set of training queries 325 may additionally or alternatively include new incoming queries received at the cloud-based assistant service 120 that have the query attributes 321 associated with the one or more of the category buckets 210 that include the threshold number of queries 119. For instance and continuing with the example, the training stage 320 may obtain at least a portion of the training queries in the set of training queries 325 by filtering out new incoming queries 119 that belong to the query vertical type related to scheduling/appointment booking and that are spoken in Language A. Further, at least a portion of the training queries obtained in the set of training queries 325 may be selected from offline data samples stored on the data storage 170 that have the attributes 121 associated with the one or more of the category buckets 210 that include the threshold number of queries 119.

Each training query in the set of training queries 325 may include corresponding audio data characterizing the training query spoken by a respective user. Each training query 325 associated with a previous query 119 processed by the assistant service may be paired with the corresponding transcription 123 generated by the cloud-based ASR model 122 of the assistant service 120. As such, the training stage 320 may use the cloud-based ASR model 122 as a teacher model for generating corresponding training labels (i.e., ground-truth transcriptions) for each sample of audio data characterizing the training queries in the set of training queries. Similarly, each training query 325 associated with a previous query 119 processed by the assistant service may be paired with the corresponding TTS response 130 including at least one of input text to the cloud-based TTS model 126 or a synthesized speech representation generated by the cloud-based TTS model 126.

Once the set of training queries and corresponding training labels are obtained/generated, the training stage 320 trains the corresponding distilled assistant model 350 on the set of training queries and the corresponding training labels generated for the training queries in the set of training queries. Training may include training for a specific amount of time, training with a specified number of training steps, training on a specified number of training queries in the set of training queries, and/or until a training loss for training the model stabilizes. Notably, in the example where the distilled assistant model 350 includes the distilled ASR model, the distilled ASR model may include a drastic reduction in size and processing requirements compared to the corresponding cloud-based ASR model 322 since the distilled ASR model 350 is customized for recognizing queries spoken in Language A and including terms/phrases related to scheduling/appointment booking. The cloud-based ASR model may include a very large multilingual model trained to recognize speech in a multitude of different languages and spanning a multitude of different query vertical types. However, since the query categorization log 312 identifies threshold numbers of queries sharing common attributes 121, the distilled ASR model may be trained as a reduced-size custom model having a configuration and parameters suited for processing queries having a limited set of attributes. The training stage 320 repeats these steps to train and generate a corresponding distilled assistant model candidate for each distilled assistant model candidate 315 identified during the identification stage 310.

After the training stage 320 generates and trains each distilled assistant model 350, the evaluation stage 330 may evaluate each distilled assistant model 350 with respect to a corresponding teacher model 380. In some examples, the teacher model 380 includes the corresponding cloud-based model of the cloud-based assistant service 120 that is related to the distilled assistant model 350. For instance, for any distilled assistant models 350 that include distilled ASR model, the evaluation stage 330 uses the cloud-based ASR model 122 of the assistant service 120 as the teacher model 380 for evaluating each of the distilled ASR models.

In some implementations, the evaluation stage 330 determines whether accuracy of the generated distilled assistant model 350 on an evaluation data set 335 is within a threshold range of accuracy of the corresponding teacher model 380 on the evaluation data set 335. In these implementations, the evaluation stage prompts the developer 190 of the cloud-based assistant service 120 to accept the generated distilled assistant model 350 for execution on the one or more target client devices 102 when the accuracy of the generated distilled model 350 on the evaluation data set is within the threshold range of the accuracy of the corresponding teacher model 350. In some examples, the evaluation set 335 includes audio data characterizing a live set of incoming queries and the distilled assistant and teacher models 350, 380 correspond to ASR models. In these examples, a word error rate (WER) of the speech recognition results output by the models 350, 380 for the incoming queries may be used as the metric to indicate the accuracy/performance of each of the models 350, 380. Other metrics may be used to indicate the accuracy/performance of the models 350, 380.

The evaluation stage 330 may prompt the developer 190 to accept the generated distilled assistant model 350 by transmitting the distillation request 332 to the developer 190. In some examples, the distillation request 332 includes a message describing characteristics of the distilled assistant model 350, target devices 102 intended to execute the distilled assistant model 350, and/or evaluation results of the distilled assistant model. For instance, the distillation request 332 transmitted to the developer 190 includes the message: "We have a distilled model available which can run on devices X. It is within 1% accuracy of the cloud-based model but will reduce latency and improve privacy". As shown in FIG. 1, the developer 190 may return a distillation approval 334 that indicates the developer accepts the generated distilled assistant model 350 for execution on the target client devices 102 specified in the distillation request 332. By the same notion, the developer 190 may reject deploying the generated distilled assistant model 350 for execution on the target devices.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 4:
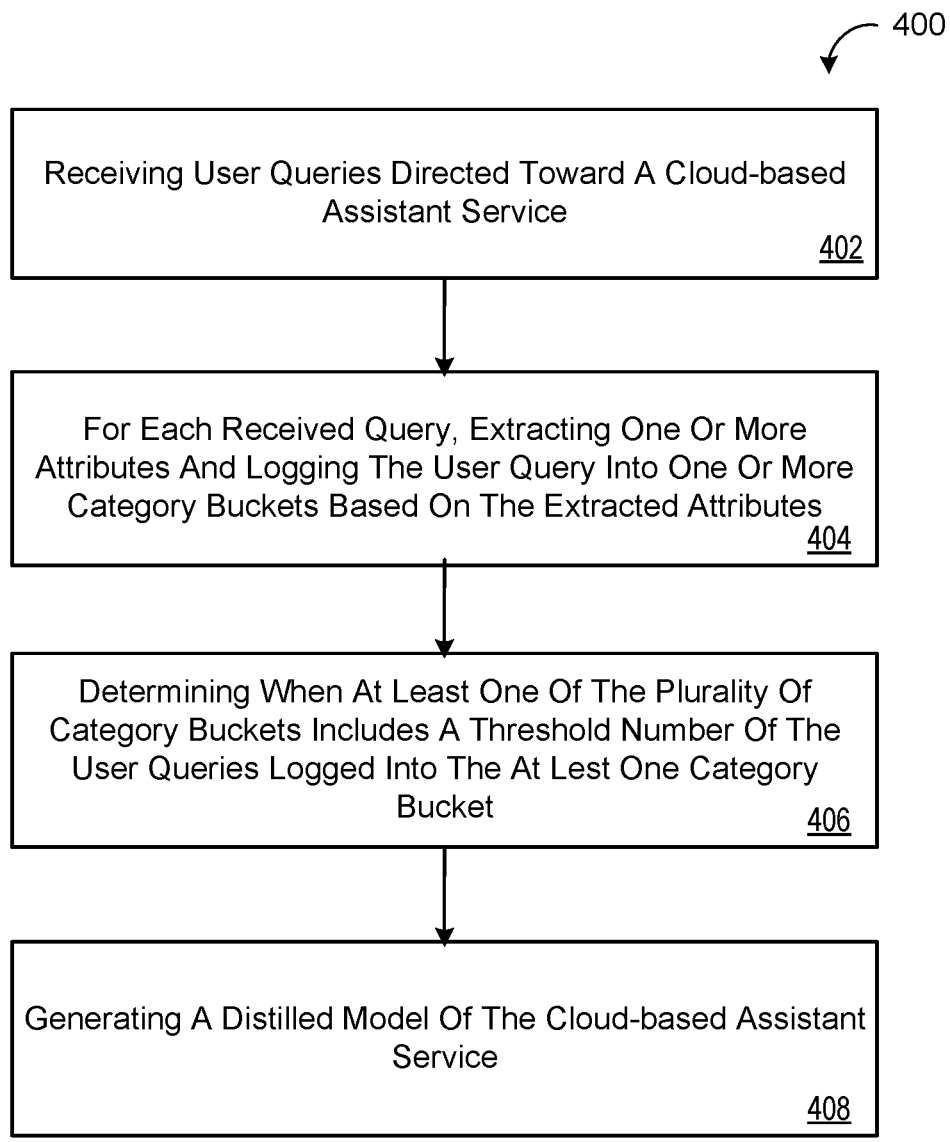
FIG. 4 is a flowchart of an example arrangement of operations for a method of distilling assistant models to client devices based on user queries directed toward a cloud-based assistant service.

FIG. 4 is a flowchart of an example arrangement of operations for a method 400 of distilling assistant models 350 to client devices 102 based on user queries 119 directed toward a cloud-based assistant service 120 executing on the data processing hardware 112 of the remote system 111. The method 400 may include a computer-implemented method that executes on the data processing hardware 112 of the remote system 111 to cause the data processing hardware 112 to perform the operations. At operation 402, the method 400 includes receiving, from a plurality of client devices 102 each associated with a respective user, user queries 119 directed toward the cloud-based assistant service 120. At operation 404, for each received user query 119 directed toward the cloud-based assistant service 120, the method 400 also includes extracting one or more attributes 121 from the user query 119 and logging the user query 119 into one or more of a plurality of category buckets 210 based on the one or more attributes 121 extracted from the user query 119.

At operation 406, the method 400 also includes determining when at least one of the plurality of category buckets 210 includes a threshold number of the user queries logged into the at least one category bucket 210. At operation 408, when the at least one of the plurality of category buckets 210 includes the threshold number of user queries, the method 400 also includes generating a distilled model 350 of the cloud-based assistant service 120. Here, the distilled model 350 of the cloud-based assistant service 120 is configured to execute on one or more target client devices 102 of the plurality of client devices 102.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
   receiving, from a plurality of client devices each associated with a respective user, user queries directed toward a cloud-based assistant service executing on the data processing hardware;
   for each received user query directed toward the cloud-based assistant service:
      extracting one or more attributes from the user query; and
      logging the user query into one or more of a plurality of category buckets based on the one or more attributes extracted from the user query;
   determining when at least one of the plurality of category buckets includes a threshold number of the user queries logged into the at least one category bucket; and
   when the at least one of the plurality of category buckets includes the threshold number of the user queries, generating a distilled model of the cloud-based assistant service, the distilled model of the cloud-based assistant service configured to execute on one or more target client devices of the plurality of client devices.

2. The computer-implemented method of claim 1, wherein the one or more attributes extracted from the user query comprise at least one of:
   a device category and/or a device type associated with the client device the user query was received from;
   a query vertical type identified for the user query;
   a language and/or locale associated with a user that spoke the user query;
   background noise levels in audio data containing the user query;
   a text-to-speech response generated by the cloud-based assistant service after fulfillment of the user query; or
   a transcription of the user query.

3. The computer-implemented method of claim 1, wherein the operations further comprise, for each received user query directed toward the cloud-based assistant service:
   processing, using an automatic speech recognition (ASR) model of the cloud-based assistant service, audio data characterizing the user query to generate a transcription of the user query,
   wherein extracting the one or more attributes from the user query comprises performing query interpretation on the transcription of the user query to identify a query vertical type for the user query,
   wherein logging the user query comprises logging the user query into a corresponding one of the plurality of category buckets associated with the query vertical type identified for the user query.

4. The computer-implemented method of claim 1, wherein the operations further comprise:
   prompting a developer of the cloud-based assistant service to accept the generated distilled model for execution on the one or more target client devices; and
   when the developer accepts the generated distilled model, deploying the distilled model to the one or more of the target client devices.

5. The computer-implemented method of claim 4, wherein the operations further comprise:

determining whether accuracy of the generated distilled model on an evaluation data set is within a threshold range of an accuracy of a teacher model on the evaluation data set,
wherein prompting the developer of the cloud-based assistant service comprises prompting the developer of the cloud-based assistant service when the accuracy of the generated distilled model on the evaluation data set is within the threshold range of the accuracy of the teacher model on the evaluation data set.

6. The computer-implemented method of claim 1, wherein generating the distilled model of the cloud-based assistant service comprises selecting a model configuration for the distilled model that satisfies memory and/or processing constraints of each of the one or more target client devices.

7. The computer-implemented method of claim 1, wherein generating the distilled model of the cloud-based assistant service comprises:
   obtaining a set of training queries having attributes associated with the at least one of the plurality of category buckets that includes the threshold number of the user queries;
   generating, using a teacher model of the cloud-based assistant service, corresponding training labels for the training queries in the set of training queries; and
   training the distilled model on the set of training queries and the corresponding training labels generated for the training queries in the set of training queries.

8. The computer-implemented method of claim 7, wherein at least a portion of the training queries in the set of training queries comprise previous user queries selected from among the threshold number of the user queries logged into each of the at least one of the plurality of category buckets.

9. The computer-implemented method of claim 7, wherein at least a portion of the training queries in the set of training queries include new incoming queries having the attributes associated with the at least one of the plurality of category buckets that includes the threshold number of the user queries.

10. The computer-implemented method of claim 7, wherein at least a portion of the training queries in the set of training queries are selected from offline data samples having the attributes associated with the at least one of the plurality of category buckets that includes the threshold number of the user queries.

11. The computer-implemented method of claim 1, wherein the operations further comprise, after deploying the generated distilled model for execution on each of the one or more target devices:
   receiving, from each target client device executing the distilled model, federated analytics indicating attributes associated with new incoming queries processed by the distilled model executing on the corresponding target client device;
   logging the new incoming queries into one or more of the plurality of category buckets based on the federated analytics;
   determining when at least another one of the plurality of category buckets includes a threshold number of the user queries and the new user queries; and
   when the at least the other one of the plurality of category buckets includes the threshold number of the user queries and the new user queries, generating another distilled model of the cloud-based assistant service, the another distilled model of the cloud-based assistant service configured to execute on one or more target client devices of the plurality of client devices.

12. The computer-implemented method of claim 1, wherein the operations further comprise, after deploying the generated distilled model for execution on each of the one or more target devices:
   receiving, from each target client device executing the distilled model, federated analytics indicating attributes associated with new incoming queries processed by the distilled model executing on the corresponding target client device;
   generating an updated distilled model by updating parameters of the distilled model based on the federated analytics received from each target device executing the distilled model; and
   deploying the updated distilled model for execution on each of the one or more target client devices.

13. The computer-implemented method of claim 12, wherein the federated analytics are received from each target client device without receiving audio data characterizing any of the new incoming queries processed by the distilled model and without receiving transcriptions of the new incoming queries processed by the distilled model.

14. The computer-implemented method of claim 1, wherein the distilled model comprises a speech recognition model.

15. The computer-implemented method of claim 1, wherein the distilled model comprises a text-to-speech model.

16. The computer-implemented method of claim 1, wherein the distilled model comprises a natural language understanding (NLU) model.

17. A system comprising:
   data processing hardware; and
   memory hardware in communication with the data processing hardware and storing instructions that when executed on the data processing hardware cause the data processing hardware to perform the operations comprising:
      receiving, from a plurality of client devices each associated with a respective user, user queries directed toward a cloud-based assistant service executing on the data processing hardware;
      for each received user query directed toward the cloud-based assistant service:
         extracting one or more attributes from the user query; and
         logging the user query into one or more of a plurality of category buckets based on the one or more attributes extracted from the user query;
      determining when at least one of the plurality of category buckets includes a threshold number of the user queries logged into the at least one category bucket; and
      when the at least one of the plurality of category buckets includes the threshold number of the user queries, generating a distilled model of the cloud-based assistant service, the distilled model of the cloud-based assistant service configured to execute on one or more target client devices of the plurality of client devices.

18. The system of claim 17, wherein the one or more attributes extracted from the user query comprise at least one of:
   a device category and/or a device type associated with the client device the user query was received from;
   a query vertical type identified for the user query;
   a language and/or locale associated with a user that spoke the user query;
   background noise levels in audio data containing the user query;
   a text-to-speech response generated by the cloud-based assistant service after fulfillment of the user query; or
   a transcription of the user query.

19. The system of claim 17, wherein the operations further comprise, for each received user query directed toward the cloud-based assistant service:
   processing, using an automatic speech recognition (ASR) model of the cloud-based assistant service, audio data characterizing the user query to generate a transcription of the user query,
   wherein extracting the one or more attributes from the user query comprises performing query interpretation on the transcription of the user query to identify a query vertical type for the user query,
   wherein logging the user query comprises logging the user query into a corresponding one of the plurality of category buckets associated with the query vertical type identified for the user query.

20. The system of claim 17, wherein the operations further comprise:
   prompting a developer of the cloud-based assistant service to accept the generated distilled model for execution on the one or more target client devices; and
   when the developer accepts the generated distilled model, deploying the distilled model to the one or more of the target client devices.

21. The system of claim 20, wherein the operations further comprise:
   determining whether accuracy of the generated distilled model on an evaluation data set is within a threshold range of an accuracy of a teacher model on the evaluation data set,
   wherein prompting the developer of the cloud-based assistant service comprises prompting the developer of the cloud-based assistant service when the accuracy of the generated distilled model on the evaluation data set is within the threshold range of the accuracy of the teacher model on the evaluation data set.

22. The system of claim 17, wherein generating the distilled model of the cloud-based assistant service comprises selecting a model configuration for the distilled model that satisfies memory and/or processing constraints of each of the one or more target client devices.

23. The system of claim 17, wherein generating the distilled model of the cloud-based assistant service comprises:
   obtaining a set of training queries having attributes associated with the at least one of the plurality of category buckets that includes the threshold number of the user queries;
   generating, using a teacher model of the cloud-based assistant service, corresponding training labels for the training queries in the set of training queries; and
   training the distilled model on the set of training queries and the corresponding training labels generated for the training queries in the set of training queries.

24. The system of claim 23, wherein at least a portion of the training queries in the set of training queries comprise previous user queries selected from among the threshold number of the user queries logged into each of the at least one of the plurality of category buckets.

25. The system of claim 23, wherein at least a portion of the training queries in the set of training queries include new incoming queries having the attributes associated with the at least one of the plurality of category buckets that includes the threshold number of the user queries.

26. The system of claim 23, wherein at least a portion of the training queries in the set of training queries are selected from offline data samples having the attributes associated with the at least one of the plurality of category buckets that includes the threshold number of the user queries.

27. The system of claim 17, wherein the operations further comprise, after deploying the generated distilled model for execution on each of the one or more target devices:
- receiving, from each target client device executing the distilled model, federated analytics indicating attributes associated with new incoming queries processed by the distilled model executing on the corresponding target client device;
- logging the new incoming queries into one or more of the plurality of category buckets based on the federated analytics;
- determining when at least another one of the plurality of category buckets includes a threshold number of the user queries and the new user queries; and
- when the at least the other one of the plurality of category buckets includes the threshold number of the user queries and the new user queries, generating another distilled model of the cloud-based assistant service, the another distilled model of the cloud-based assistant service configured to execute on one or more target client devices of the plurality of client devices.

28. The system of claim 17, wherein the operations further comprise, after deploying the generated distilled model for execution on each of the one or more target devices:
- receiving, from each target client device executing the distilled model, federated analytics indicating attributes associated with new incoming queries processed by the distilled model executing on the corresponding target client device;
- generating an updated distilled model by updating parameters of the distilled model based on the federated analytics received from each target device executing the distilled model; and
- deploying the updated distilled model for execution on each of the one or more target client devices.

29. The system of claim 28, wherein the federated analytics are received from each target client device without receiving audio data characterizing any of the new incoming queries processed by the distilled model and without receiving transcriptions of the new incoming queries processed by the distilled model.

30. The system of claim 17, wherein the distilled model comprises a speech recognition model.

31. The system of claim 17, wherein the distilled model comprises a text-to-speech model.

32. The system of claim 17, wherein the distilled model comprises a natural language understanding (NLU) model.

* * * * *